United States Patent
Ross et al.

(10) Patent No.: US 10,642,606 B2
(45) Date of Patent: May 5, 2020

(54) RE-USE OF CODE

(71) Applicant: International Business Machines Corporation, Armonk, NY (US)

(72) Inventors: Martin A. Ross, Gosport (GB); Mark J. Lawrence, Eastleigh (GB); James Hewitt, Eastleigh (GB); Caroline Jane Thomas, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/718,162

(22) Filed: Sep. 28, 2017

(65) Prior Publication Data
US 2019/0095197 A1    Mar. 28, 2019

(51) Int. Cl.
| | |
|---|---|
| G06F 9/44 | (2018.01) |
| G06F 8/70 | (2018.01) |
| G06F 11/36 | (2006.01) |
| G06F 16/16 | (2019.01) |
| G06F 8/36 | (2018.01) |
| G06F 8/71 | (2018.01) |

(52) U.S. Cl.
CPC ............ *G06F 8/70* (2013.01); *G06F 8/36* (2013.01); *G06F 8/71* (2013.01); *G06F 11/3616* (2013.01); *G06F 16/164* (2019.01)

(58) Field of Classification Search
CPC ........................................................ G06F 8/70
See application file for complete search history.

(56) References Cited

U.S. PATENT DOCUMENTS

| | | | |
|---|---|---|---|
| 8,302,073 B2 | 10/2012 | Caceres et al. | |
| 8,843,882 B1* | 9/2014 | Dejban | G06F 8/77 707/638 |
| 9,009,656 B2 | 4/2015 | Drake et al. | |
| 2011/0246968 A1* | 10/2011 | Zhang | G06F 8/751 717/125 |
| 2012/0159434 A1* | 6/2012 | Dang | G06F 8/36 717/120 |
| 2014/0173561 A1* | 6/2014 | Toub | G06F 8/73 717/123 |

(Continued)

FOREIGN PATENT DOCUMENTS

WO    2012071433 A1    5/2012

OTHER PUBLICATIONS

De Wit, et al., "Managing Code Clones Using Dynamic Change Tracking and Resolution*", IEEE International Conference on Software Maintenance, 2009, 10 pages, http://ieeexplore.ieee.org/abstract/document/5306336/.

(Continued)

*Primary Examiner* — Hang Pan
(74) *Attorney, Agent, or Firm* — Peter Edwards

(57) ABSTRACT

Concepts for managing code copied from a source repository to a target repository are proposed. Example embodiments comprises generating metadata relating to code copied from the source repository. At the target repository, source repository is monitored to determine if the code copied from the source repository has been modified within the source repository based on the metadata. Responsive to determining the code copied from the source repository has been modified within the source repository, a notification relating to the modification is generated at the target repository.

20 Claims, 5 Drawing Sheets

(56) References Cited

U.S. PATENT DOCUMENTS

| | | | |
|---|---|---|---|
| 2014/0297474 A1* | 10/2014 | Wen | G06Q 30/0623 |
| | | | 705/26.61 |
| 2015/0277860 A1 | 10/2015 | Hur et al. | |
| 2016/0062876 A1* | 3/2016 | Narayanan | G06F 11/3684 |
| | | | 717/130 |
| 2016/0070547 A1 | 3/2016 | Ramanathan | |
| 2016/0080562 A1* | 3/2016 | Lawson | H04L 63/10 |
| | | | 455/414.1 |
| 2016/0124742 A1* | 5/2016 | Rangasamy | H04L 47/70 |
| | | | 717/103 |
| 2016/0295463 A1 | 10/2016 | Dsouza et al. | |

OTHER PUBLICATIONS

Dan, et al., "SOA Service Reuse by Design," Proceedings of the 2nd international workshop on Systems development in SOA environments, 2008, 4 pages, http://dl.acm.org/citation.cfm?id=1370923.

Unknown, "Don't repeat yourself," Wikipedia, Definition, Printed Sep. 15, 2017, 2 pages.

St. Jules, "JS Inspect," GitHub, Printed Sep. 15, 2017, 4 pages, https://github.com/danielstjules/jsinspect.

Unknown, "Fork a Repo," Bootcamp, GitHub Help, Printed Sep. 15, 2017, 4 pages, https://help.github.com/articles/fork-a-repo/.

Needham, "Micro Services: The curse of code 'duplication'", Printed Sep. 20, 2017, 5 pages, http://www.markhneedham.com/blog/2012/11/28/micro-services-the-curse-of-code-duplication/.

* cited by examiner

RE-USE OF CODE

BACKGROUND

The present invention relates to application development and more particularly to managing source code (or 'code') that is copied from a source repository for use in a target repository.

In computer science, the term "source code" (or simply "code") typically refers to computer instructions written using some (normally human-readable) computer language, usually as text. Code of a computer program or application is specially designed to facilitate the work of computer programmers (also referred to herein as "software developers" or simply "developers"), who specify the actions to be performed by a computer mostly by writing source code.

SUMMARY

According to an embodiment of the present invention there is provided a computer-implemented method for managing code copied from a source repository to a target repository. The method comprises generating metadata relating to the code copied from the source repository. At the target repository, the source repository is monitored to determine if the code copied from the source repository has been modified within the source repository based on the metadata. Responsive to determining the code copied from the source repository has been modified within the source repository, there is generated, at the target repository, a notification relating to the modification.

According to another embodiment of the present invention, there is provided a computer program product for managing code copied from a source repository to a target repository. The computer program product comprises a computer readable storage medium having program instructions embodied therewith. The program instructions are executable by a processing unit to cause the processing unit to perform a method comprising: generating metadata relating to the code copied from the source repository; at the target repository, monitoring the source repository to determine if the code copied from the source repository has been modified within the source repository based on the metadata; and responsive to determining the code copied from the source repository has been modified within the source repository, generating, at the target repository, a notification relating to the modification.

According to yet another aspect, there is provided a processing system comprising at least one processor and the computer program product according to one or more embodiments, wherein the at least one processor is adapted to execute the computer program code of said computer program product.

According to another aspect, there is provided a system for managing code copied from a source repository to a target repository. The system comprises a metadata component adapted to generate metadata relating to the code copied from the source repository. The system further comprises, at the target repository, a monitor component adapted to monitor the source repository to determine if the code copied from the source repository has been modified within the source repository based on the metadata. The system also comprises a notification component adapted, in response to the monitor determining the code copied from the source repository has been modified within the source repository, to generate, at the target repository, a notification relating to the modification.

BRIEF DESCRIPTION OF THE DRAWINGS

Preferred embodiments of the present invention will now be described, by way of example only, with reference to the following drawings, in which.

DETAILED DESCRIPTION

Figure 1:
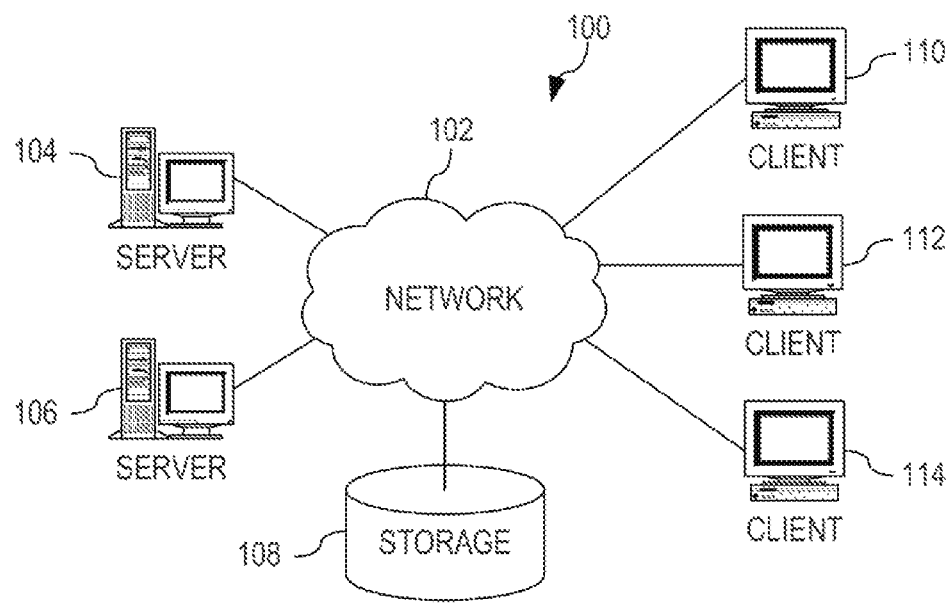
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (code) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet, and so on to cooperatively execute at least one embodiment of the methods of the present invention.

The present invention seeks to provide a method for managing code copied from a source repository to a target repository. The proposed method may distribute a monitoring process/requirement to one or more target repositories that have copied code from a source repository, thereby reducing or removing a burden on the source repository to notify or update entities regarding a modification (e.g. change, alteration, conversion, amendment, revision, etc.) in code of the source repository. Embodiments may thus provide support for the development of applications or services in scalable service architectures.

The present invention further seeks to provide a computer program product including computer program code for implementing the method when executed on a processor of a data processing system.

The present invention yet further seeks to provide a processing system adapted to execute this computer program code.

With the recent development of scalable and distributed computing systems, computer programs or applications may be developed to request and/or deliver services (such as micro-services) from/to other programs or applications.

Such a distributed (e.g. micro-service) architecture enables isolation between applications, and thus allows code changes to be promoted to production environments faster. Sharing code between applications or services couples the applications/services together and thus reduces the degree of isolation and ability to handle change.

When developing (e.g. designing or writing code for) a new micro-service, for example, there may be code of other micro-services that could be re-used for the new micro-service (e.g. to save time). Accordingly, in large monolithic systems it is known to provision a separate code library or module for providing common code that may be used (e.g. invoked or called upon) by different applications or services. However, in a distributed (e.g. micro-service) architecture this couples the applications or service together and thus negates a benefit of the architecture.

Proposed is a concept of adapting a target repository to monitor a source repository (from which the target repository has copied code) for changes in copied code. To facilitate the monitoring process, metadata relating to the code copied from the source repository may be generated and associated with the copied code. Such metadata may be used to determine if a detected change at the source repository may impact the code that the target repository has copied (i.e. impact the code at the target repository). For instance, the metadata may be used in conjunction with the monitoring process so as to filter detected changes or events at the source repository, thus enabling identification of change or events at the source repository that may impact copied code at the target repository whilst ignoring/discarding other changes or events at the source repository that do not impact the copied code at the target repository. By way of example only, the metadata may identify a location, file, and/or lines of the code that was copied from the source repository to the target repository. Using such information, the monitoring process may then determine if a change or event at the source repository relates to the code that was copied from the source repository to the target repository, for example by comparing properties of the change/event with the metadata.

Proposed embodiments may therefore place an onus on the target repository to listen for changes in/at a source repository (on a pubsub Application Programming Interface (API) for example). Also, having such control may enable additional actions to be taken, such as de-registering or disabling the listening/monitoring process (e.g. if issues or pull requests that are generated are ignored or not actioned, or if the code at the target repository diverges from the code at the source repository by more than a threshold amount).

According to embodiments, a metadata component may set up appropriate controls on the target repository at a high (e.g. control or management) level, rather than augmenting metadata at an individual file level. Also, a monitoring process/component is employed at the target repository (rather than the source repository, for example) which may be advantageous if there are multiple target repositories which have copied code from an individual source repository. For instance, embodiments may avoid a need for the individual source repository to updated all target repositories regarding a change or event at the source repository for example.

Proposed concepts may support a transition to micro-services by supporting re-use of code when developing applications or services whilst maintaining isolation (e.g. reducing or avoiding coupling) between the applications/services.

Illustrative embodiments may therefore provide concepts for managing the copying and pasting of code from a source of code (such as a source file, source code entity, source program, or source repository) to a target (e.g. target file, target code entity, target program, or target repository). Dynamic code re-use management or optimization may therefore be provided by proposed embodiments.

Embodiments may be at least partly based on the realization that a source of copied code may be remotely monitored in conjunction with information about the copied code to identify when the copied code has been modification. The information may, for instance, be generated as metadata when the code is copied from its source, thus providing for a system or approach which automatically provisions information about copied code at the time of copying. The information may then be stored in a centralized or shared data storage component and accessed by a remote monitoring process in order to identify relevant instances of code changes or event at the source of the copied code.

Embodiments may employ a concept of associating metadata relating to copied code with the respective copied code. When a change or modification to code is implemented at the source of the copied code, the change/modification may be identified by a remote monitoring process.

In some embodiments, monitoring of the source repository may be terminated in response to a disable command. The disable command may, for example, be based on a user input signal. In this way, embodiments may be adapted to disable the monitoring process when instructed by a user (and the user may, for example be prompted to provide such an instruction when a copy and paste procedure is undertaken by the user). Additionally, or alternatively, proposed embodiments may determine a measure of similarity between code at the target repository and the code copied from the source repository, and may then generating the disable command based on the determined measure of similarity. This may enable the monitoring process to be disabled when the source and target codes have diverged beyond a predetermined threshold value/amount. In some embodiments, the disable command may be provided when an issue is closed or solved, for example.

Proposed embodiments may, responsive to the notification relating to the modification, automatically modify code at the target repository based on the modification. Automatic alignment and/or updating of copied code may thus be enabled by proposed embodiments.

Alternatively, or additionally, proposed embodiments may, responsive to the notification relating to the modification, provide a developer with a component for updating code at the target repository based on the modification. For instance, embodiments may provide a notification to a developer via a webhook or pubsub API. A developer receiving such a notification may then make changes to the copied code as deemed appropriate. Further, the notification may also provide a suggestion (e.g. example code) to a developer, and the suggestion may be based on conventional merge tool components.

The metadata relating to the code copied from the source repository may comprise information relating to at least one of: the source repository; a source file comprising the copied code; a source code entity comprising the copied code; a location of the copied code in the source repository; a description of the copied code; a function/method; change history; programming language; and a property of the copied code. Metadata may thus be generated and/or employed by embodiments for assisting in the determination as to whether or not a modification or code event at the source repository may impact code that has been copied to the target repository. The metadata may therefore include information relating to the location, line(s), and/or properties of the copied code. Such information may then be used to identify relevant instances of code changes or events at the source repository of the copied code. Code changes or events at the source repository that are not relevant to code that has been copied to the target repository may then be filtered, disregarded or ignored by a monitoring process using the metadata to identify classify/categorize relevant code changes or events at the source repository at the source repository.

Illustrative embodiments may be utilized in many different types of code development environments. Embodiments may, for example, be employed in relation to micro-service development, or to programming of de-coupled services in a distributed processing environment. For example, code copied from the source repository may comprise source code for a micro-service.

Proposed concepts may be implemented in (or in conjunction with) copy-paste operations to identify when code from one development project (e.g. 'source project') is copied (e.g. 'copy and pasted') into another development project (e.g. 'target project'). The development projects may be linked at code management level and then action may be taken when the source of the copied code (i.e. 'source project') is modified. Such action may include raising an issue on the target project and/or invoking a pull request with merged code (e.g. pulling new code from the source project and merging it into the code of the target project).

Figure 2:
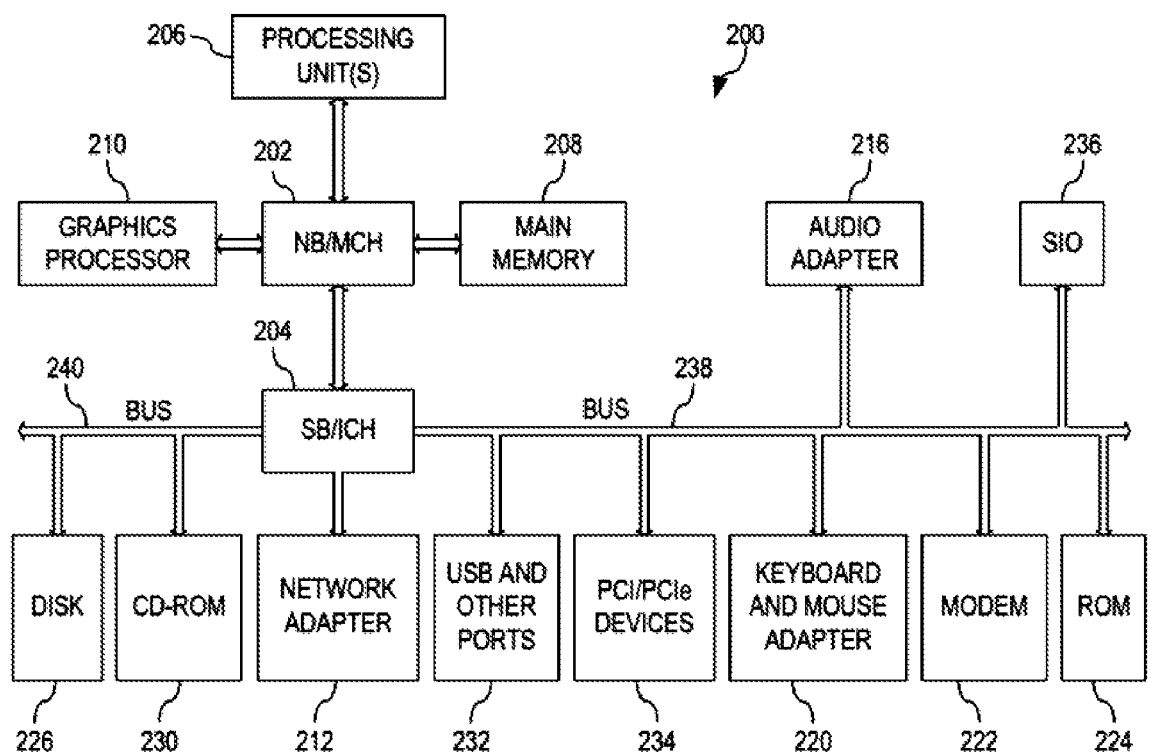
FIG. 2 is a block diagram of an example code processing system in which aspects of the illustrative embodiments may be implemented.

In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed data processing system 100 may include additional servers, clients, and other devices not shown.

In the depicted example, the distributed data processing system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system may run in conjunction with the operating system and provides calls to the operating system from programs or applications executing on system 200.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices (such as HDD 226 and CD-ROM drive 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the local area network LAN adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance a development system by enabling management of code copied from one development project to another without coupling the projects (e.g. to a common or shared code module). Embodiments may enable code events or modifications at the source of the copied code to be monitored in conjunction with metadata relating to the code that has been copied to a target project so as to identify events/modifications that may be relevant to copied code of the target project. Relevant events/modifications may then be acted upon at the target project, whilst irrelevant events/modifications may be ignored at the target projection. Such proposals can avoid a need for the source of the copied code to transmit or broadcast notifications to multiple projects when a code event or modification occurs.

Figure 3:
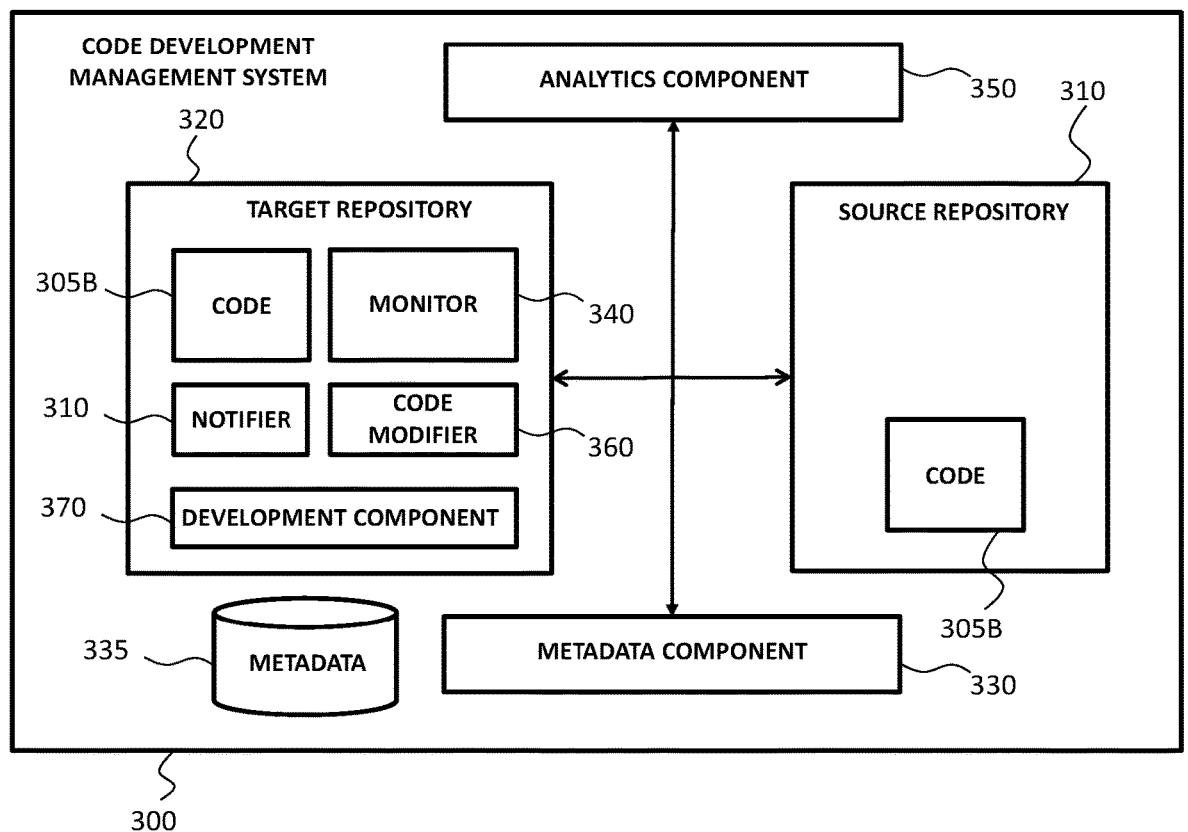
FIG. 3 depicts a schematic block diagram of an exemplary embodiment.

Referring now to FIG. 3, there is depicted a schematic block diagram of a code development management system 300 according to an exemplary embodiment. The embodiment may be suitable for managing code copied (e.g. 'copy and pasted') from a source repository 310 to a target repository 320, for example, for the purpose of developing code for a micro-service.

The system comprises a metadata component 330 adapted to generate metadata relating to code 305B copied from the source repository 310. For instance, the metadata relating to the code 305B copied from the source repository 310 may comprise information relating to: the source repository 310; a source file comprising the copied code 305B; a source code entity comprising the copied code 305B; a location of the copied code in the source repository 310; a description of the copied code 305B; and a property of the copied code 305B. The system includes a metadata storage unit 335 which is adapted to store metadata generated by the metadata component 330. The metadata may, for instance, be stored along with association information identifying what copied data the metadata relates to.

The system 300 also comprises a target repository 320. At the target repository 320, there is provided a monitor component (or 'monitor') 340 which is adapted to monitor the source repository 310 so as to determine if code copied from the source repository 310 has been modified within the source repository 310 based on the metadata associated with (i.e. relating to) the copied code.

At the target repository 320, there is also provided a notification component (or 'notifier'), such as source repository 310, adapted, in response to the monitor component (or 'monitor') 340 determining the code 305B copied from the source repository 310 has been modified within the source repository 310, to generate a notification relating to the modification.

In this example, the monitor component 340 is also adapted to terminate monitoring of the source repository 310 in response to a disable command. For this purpose, the system 300 includes an analytics component 350 which is adapted to determine a measure of similarity between code 305B at the target repository 320 and the code 305B copied from the source repository 310. Based on the determined measure of similarity, the analytics component may generate a disable command and provide it to the monitor component 340. By way of example, the analytics component 350 may generate a disable command if it is determined that the code 305B at the target repository 320 has diverged (e.g. in purpose, function or implementation) significantly from the code 305B copied from the source repository 310. Alternatively, of additionally, the system 300 may be adapted to generate a disable command based on a received user input signal.

In the exemplary embodiment, the target repository 320 also includes a code modifier 360 adapted, in response to the notification relating to the modification, to automatically modify code at the target repository 320 based on the modification. This may provide for automatic alignment and/or updating of the copied code 305B.

Further, the target repository 320 also includes a development component 370 adapted, in response to the notification relating to the modification, to provide a developer with means for updating code 305B at the target repository 320 based on the modification. For instance, the development component 370 may provide a notification to a developer via a webhook or pubsub API. A developer receiving such a notification may then make changes to the copied code 305B as they deem necessary and/or appropriate.

By way of further explanation, an example will now be detailed where a microservice architecture solution is being developed using GITHUB® for source code management and the source code for each microservice is contained in separate GITHUB® repositories. The exemplary implementation may be summarised as following:

(i) User is developing 'serviceB' and identifies code in 'serviceA' that they want to re-use. The use does not want to pull this into a shared library as this will couple the microservices. Also, the user does want to benefit from any changes made to the code in serviceA that may fix bugs;

(ii) The user opens the source file from serviceA in an integrated developer environment (IDE);

(iii) The user copies the code fragment from the source file in the IDE;

(iv) The system augments the clipboard data with information relating to the source location (e.g. repository, file and lines);

(v) The user then opens the target source file from serviceB in the IDE;

(vi) The user pastes the code fragment from the clipboard into the target source file in serviceB;

(vii) The system identifies on paste that there is information relating to the code fragment;

(vii) A listener is step up on the serviceA repository which monitors for code changes;

(viii) Code is committed and pushed to GITHUB®;

(ix) A bug is found in the source code in serviceA that was previously copied and a fix is made to serviceA;

(x) The system is listening for changes and identifies this code change to serviceA impacts the lines previously copied;

(xi) The system creates an issue on the serviceB repository to highlight the bug fix at serviceA;

(xii) A change is made to the source code in serviceA, but in a different file;

(xiii) The system is listening for changes and identifies the code change is not related to the previously copied code for serviceB so takes no further action;

At step (xi) above, the system may also generate a pull request and/or suggest a code change based on existing merge tool technologies.

It will thus be appreciated that embodiments may be built into an IDE, source code management system, operating system, or combination thereof.

Proposed embodiments may also disable the listener when instructed by the user (which may include prompt on copy/paste) or when the source and targets have diverged beyond a given threshold, or when an issue is closed without any associated changes (for instance).

Embodiments may implement the following components:

A clipboard component that records metadata on source location (including repository, file, lines, etc.);

A listener component that, responsive to a paste operation, listens for changes to the source identified through metadata; and A defect generating component that generates a defect on the target repository when change is detected in the source repository.

In some embodiments, there may be provided a system comprising a processing arrangement adapted to carry out any concept previously described with reference to FIGS. 1 to 3.

Figure 4:
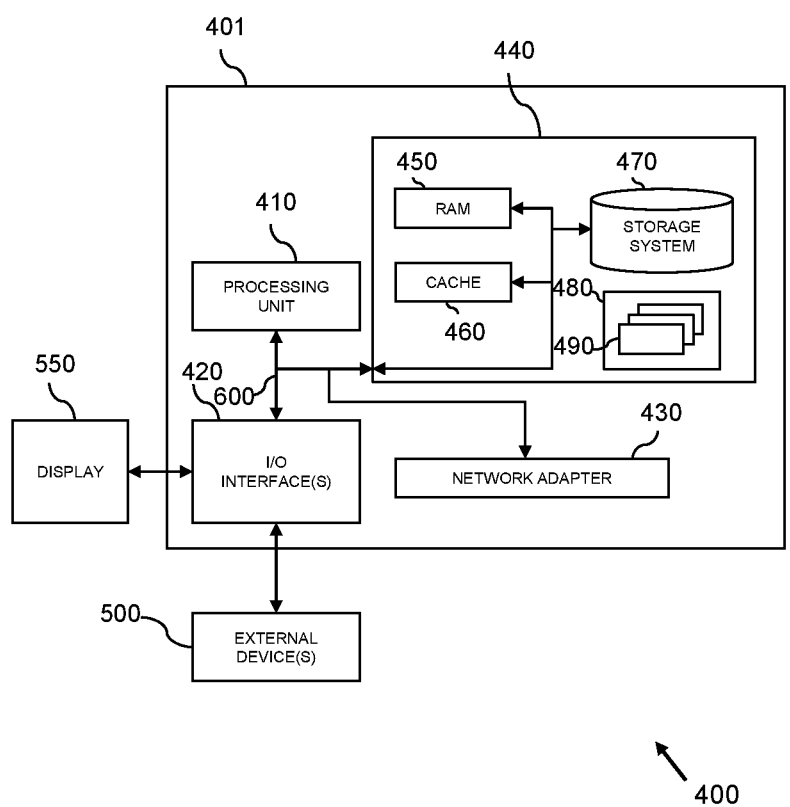
FIG. 4 is a simplified block diagram of a networked system comprising a computer system according to an embodiment.

By way of example, as illustrated in FIG. 4, embodiments may comprise a computer system 401, which may form part of a networked system 400. The components of computer system/server 401 may include, but are not limited to, one or more processing arrangements, for example comprising processors or processing units 410, a system memory 440, and a bus 600 that couples various system components including system memory 440 to processing unit 410.

Bus 600 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 401 typically includes a variety of computer system readable media. Such media may be any available media that is accessible by computer system/server 401, and it includes both volatile and non-volatile media, removable and non-removable media.

System memory 440 can include computer system readable media in the form of volatile memory, such as random access memory (RAM) 450 and/or cache memory 460. Computer system/server 401 may further include other removable/non-removable, volatile/non-volatile computer system storage media. By way of example only, storage system 470 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 600 by one or more data media interfaces. As will be further depicted and described below, system memory 440 may include at least one program product having a set (e.g., at least one) of program modules that are configured to carry out the functions of embodiments of the invention.

Program/utility 480, having a set (at least one) of program modules 490, may be stored in system memory 440 by way of example, and not limitation, as well as an operating system, one or more application programs, other program modules, and program data. Each of the operating system, one or more application programs, other program modules, and program data or some combination thereof, may include an implementation of a networking environment. Program modules 490 generally carry out the functions and/or methodologies of embodiments of the invention as described herein.

Computer system/server 401 may also communicate with one or more external devices 500 such as a keyboard, a pointing device, a display 550, etc.; one or more devices that enable a user to interact with computer system/server 401; and/or any devices (e.g., network card, modem, etc.) that enable computer system/server 401 to communicate with one or more other computing devices. Such communication can occur via Input/Output (I/O) interfaces 420. Still yet, computer system/server 401 can communicate with one or more networks such as a local area network (LAN), a general wide area network (WAN), and/or a public network (e.g., the Internet) via network adapter 430. As depicted, network adapter 430 communicates with the other components of computer system/server 401 via bus 600. It should be understood that although not shown, other hardware and/or software components could be used in conjunction with computer system/server 401. Examples, include, but are not limited to: microcode, device drivers, redundant processing units, external disk drive arrays, RAID systems, tape drives, and data archival storage systems, etc.

Figure 5:
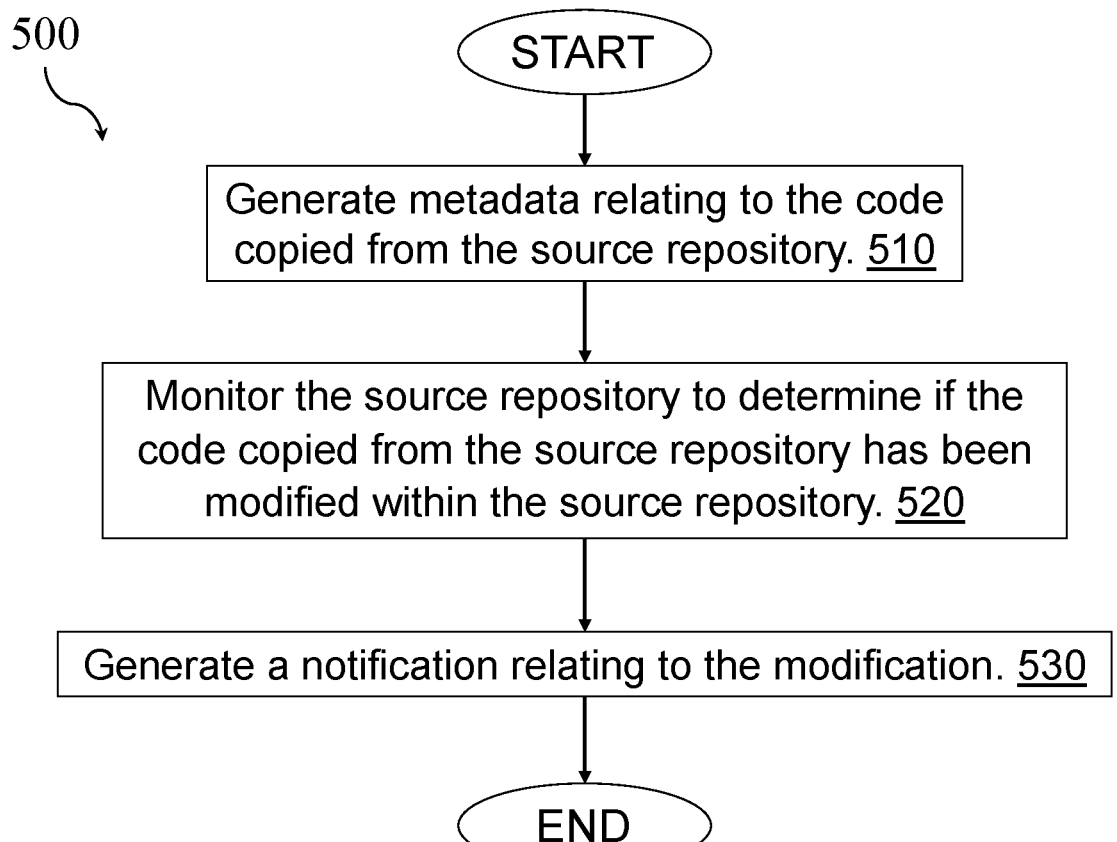
FIG. 5 illustrates a flowchart of a method, in accordance with embodiments of the present disclosure.

Referring now to FIG. 5, an operational flowchart illustrating a computer-implemented method for managing code copied from a source repository to a target repository 500 is depicted according to at least one embodiment. At 510, the metadata component 330 generates metadata relating to the code copied from the source repository. Then at 520, at the target repository 320, the monitor component 340 monitors the source repository 310 to determine if the code copied from the source repository 310 has been modified within the source repository 310 based on the metadata. Next at 530, responsive to determining the code copied from the source repository has been modified within the source repository, source repository 310 generates, at the target repository, a notification relating to the modification.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
creating a second instance of code in a target repository by copying a first instance of code in a source repository to the target repository;
generating, by a processor, metadata relating to the first instance of code;
at the target repository, monitoring the source repository to determine if the first instance of code has been modified based on the metadata, wherein the metadata comprises at least information relating to the source repository, a source file comprising the first instance of code, the first instance of code, and a property of the first instance of code;
responsive to determining the first instance of code has been modified, generating, at the target repository, a notification relating to the modification, wherein the notification includes raising an issue, the issue highlighting the modification to the first instance of code;
disabling the monitoring when the first instance of code and the second instance of code have diverged beyond a predetermined threshold value and when the issue is closed without any associated changes; and
providing a user with a component for updating the second instance of code at the target repository based on the notification and the disabling.

2. The method of claim 1, further comprising, responsive to a disable command, terminating monitoring of the source repository.

3. The method of claim 2, further comprising
generating the disable command based on a user input signal.

4. The method of claim 1, further comprising
responsive to the notification relating to the modification, modifying the second instance of code at the target repository based on the modification.

5. The method of claim 1, further comprising responsive to the notification relating to the modification, providing a component for updating code at the target repository based on the modification.

6. The method of claim 1, wherein the metadata relating to the first instance of code further comprises information relating to at least one of:
a source code entity comprising the first instance of code,
a location of the first instance of code in the source repository,
a description of the first instance of code,
a function/method,
change history, and
programming language.

7. The method of claim 1, wherein the first instance of code comprises source code for a micro-service.

8. The computer-implemented method of claim 1, wherein the providing is executed via a webhook.

9. The computer-implemented method of claim 1, wherein the component is a pubsub application programming interface.

10. A computer program product comprising a computer readable storage medium having program instructions embodied therewith, the program instructions executable by at least one processor to cause the at least one processor to perform a method comprising:
creating a second instance of code in a target repository by copying a first instance of code in a source repository to the target repository;
generating, by a processor, metadata relating to the first instance of code;
at the target repository, monitoring the source repository to determine if the first instance of code has been modified based on the metadata, wherein the metadata comprises at least information relating to the source repository, a source file comprising the first instance of code, the first instance of code, and a property of the first instance of code;
responsive to determining the first instance of code has been modified, generating, at the target repository, a notification relating to the modification, wherein the notification includes raising an issue, the issue highlighting the modification to the first instance of code;
disabling the monitoring when the first instance of code and the second instance of code have diverged beyond a predetermined threshold value and when the issue is closed without any associated changes; and
providing a user with a component for updating the second instance of code at the target repository based on the notification and the disabling.

11. The computer program product of claim 10, wherein the at least one processor is adapted to execute computer program code of said computer program product.

12. The computer program product of claim 11, wherein the at least one processor is adapted to implement a part of a micro-service-oriented architecture.

13. A system comprising:
a memory; and
one or more processing circuits communicatively coupled to the memory, wherein the one or more processing circuits are configured to:
create a second instance of code in a target repository by copying a first instance of code in a source repository to the target repository;
generate metadata relating to the first instance of code;
monitor the source repository to determine if the first instance of code has been modified based on the metadata, wherein the metadata comprises at least information relating to the source repository, a source file comprising the first instance of code, the first instance of code, and a property of the first instance of code;
generate, at the target repository in response to the determining, a notification relating to the modification, wherein the notification includes raising an issue, the issue highlighting the modification to the first instance of code;
disable the monitoring when the code in the source repository and the code within the target repository have diverged beyond a predetermined threshold value and when the issue is closed without any associated changes; and
provide a user with a component for updating the second instance of code at the target repository based on the notification and the disabling.

14. The system of claim 13, wherein responsive to a disable command, the monitor component is adapted to terminate monitoring of the source repository.

15. The system of claim 14, wherein the system is adapted to generate the disable command based on a user input signal.

16. The system of claim 13, further comprising a code modifier adapted, in response to the notification relating to the modification, to modify the second instance of code at the target repository based on the modification.

17. The system of claim 13, further comprising a development component adapted, in response to the notification relating to the modification, to provide a component for updating code at the target repository based on the modification.

18. The system of claim 13, wherein the metadata further comprises information relating to at least one of:
   a source code entity comprising the first instance of code,
   a location of the first instance of code in the source repository,
   a description of the first instance of code,
   a function/method,
   change history, and
   programming language.

19. The system of claim 13, wherein the first instance of code comprises source code for a micro-service.

20. The system of claim 19, wherein at least one processor is adapted to implement a part of a micro-service-oriented architecture.

* * * * *